Figure 2:
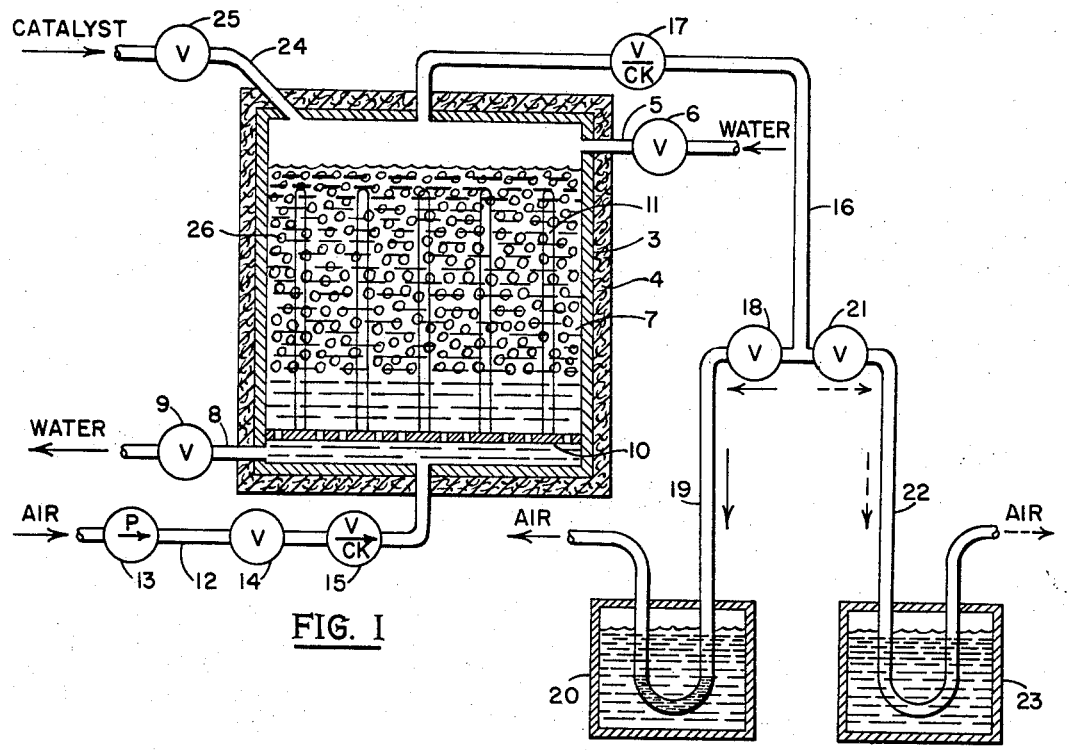

April 16, 1968  J. G. MORSE  3,378,475
PROCESS FOR THE FIXATION OF NITROGEN BY MEANS OF HIGH
ENERGY IONIZING RADIATION
Filed Oct. 12, 1962

FIG. I

INVENTOR.
JEROME G. MORSE
BY
Robert L. Berger
ATTORNEY

United States Patent Office 3,378,475
Patented Apr. 16, 1968

3,378,475
PROCESS FOR THE FIXATION OF NITROGEN BY MEANS OF HIGH ENERGY IONIZING RADIATION
Jerome G. Morse, Baltimore, Md., assignor to Martin-Marietta Corporation, New York, N.Y., a corporation of Maryland
Filed Oct. 12, 1962, Ser. No. 230,100
8 Claims. (Cl. 204—157.1)

This invention relates to the fixation of nitrogen and, more particularly, to a method and apparatus which permit the production of oxides of nitrogen from air more effectively and efficiently than heretofore possible.

Innumerable chemical processes and products involve the utilization of nitrogen in a chemically active form. While nitrogen is one of the most common of elements, comprising approximately 75 percent by weight and approximately 78 percent by volume of the air which we breathe, the fact that a triple electrostatic bond exists between electrons in molecules of nitrogen when in its natural form renders elementary nitrogen relative inert and unsatisfactory for direct use in such processes or in forming such products. Before nitrogen can be effectively utilized, it is necessary that this electrostatic bond be broken or sufficiently weakened to permit the atoms of nitrogen to combine with other elements to form relatively stable and chemically active compounds.

Various methods have heretofore been proposed and utilized for the fixation of nitrogen. Probably the most common of these heretofore proposed methods are as follows:

(1) The combination of nitrogen with oxygen in an electric arc, spread out by a magnetic field or a stream of air, and rapidly quenched to provide a useful yield.

(2) Heating calcium carbide to a high temperature in the presence of nitrogen to form $CaCN_2+C$.

(3) The synthesis of ammonia from hydrogen and nitrogen with a catalyst under high temperature and pressure conditions.

Although the first above mentioned process utilizes the oxygen and nitrogen content of atmospheric air, it is extremely inefficient in operation producing only low yields of reaction products. The second and third processes noted have the disadvantage of not fully utilizing the inexpensive constituents of readily available atmospheric air, requiring purified nitrogen plus either calcium carbide or hydrogen, respectively.

It has also been proposed to irradiate air in order to fix the nitrogen contained therein; however, such a process is extremely inefficient. While the process of the present invention contemplates the use of a source of radiation, it inherently provides greater yields than obtainable from a process wherein atmospheric air is directly exposed to irradiation.

It is, therefore, a primary object of the present invention to provide an effective and efficient method for the fixation of nitrogen from atmospheric air. In addition, a method and apparatus are provided whereby radiation energy is used to produce high yields of oxides of nitrogen from atmospheric air. A method and apparatus are also provided whereby free radicals, ions and excited states of water are caused to attack a continuous supply of atmospheric air to produce various oxides of nitrogen. Still further, this invention provides a method and apparatus for the fixation of nitrogen from atmospheric air in the presence of a catalyst in a more efficient manner than heretofore possible.

These and other objects and advantages of this invention will become apparent as the following description is read in connection with the accompanying drawings in which:

FIGURE 1 is a diagramattic illustration of one embodiment of the present invention wherein an internal source of radiation is employed to irradiate a catalytic fluidized bed; and FIGURE 2 diagrammatically illustrates the use of an external source of radiation to irradiate a catalytic fluidized bed and which may be employed in the present invention in lieu of an internal source of radiation as shown in FIGURE 1.

Briefly, this invention comprises irradiating a fluidized bed wherein particles of a catalyst are suspended in water by the passage of air therethrough. Free radicals, ions and activated molecules of water are thereby created which attack the nitrogen molecules from the air to produce various oxides of nitrogen in relatively high yields.

A preferred embodiment of the present invention has been illustrated in FIGURE 1. As shown therein, a tank 3 formed from any suitable material such as stainless steel is provided with a thermal insulating jacket 4. The interior of the tank 3 is connected to a source of water by a conduit 5 which is provided with a valve 6 permitting the tank to be filled with a body of water 7. Connected to the lower portion of the tank 3 is a conduit 8 including a valve 9 thereby permitting the water 7 contained within the tank 3 to be drained therefrom. A perforated plate 10 is mounted across the interior of the tank 3 being spaced a small distance from the bottom thereof and has a plurality of suitably enclosed radioisotope fuel elements 11 mounted thereon. Typically, these fuel elements 11 may consist of stainless steel jacketed cobalt-60 or stainless steel jacketed cesium-137 rods.

The bottom of the interior of the tank 3 is connected to a source of atmospheric air by a conduit 12 which includes a pump 13, a valve 14 and a check valve 15. A conduit 16 provided with a check valve 17 is connected to the top of the tank 3 to permit the gases flowing therefrom to be directed either through a valve 18, a conduit 19 and a cold trap 20 or through a valve 21, a conduit 22 and a cold trap 23.

Connected to the tank 3 in a manner permitting a catalyst 26 in particulate form to be fed into the tank is a conduit 24 which includes a valve 25. The perforations of the porous plate 10 are dimensioned so as to preclude the passage of the particles of catalyst 26 but to permit the vertical upward passage of air therethrough. The function of the catalyst 26 is to reduce the amount of energy required by elementary nitrogen to render it capable of combining with oxygen. Many catalysts have long been known and employed for this purpose and it is not intended that this invention be restricted to the use of any particular catalyst; however, catalysts employed in performing this invention must be insoluble in water. Exemplary of catalysts which may be utilized are tungsten; tungsten alloys; mixtures of iron, aluminum and potassium oxides; iron oxide plus molybdenum; etc. While the optimum size of the catalyst particles 26 will naturally vary from application to application, satisfactory results will normally be realized when they are between approximately 0.5 and 5 microns in size providing surface areas of between approximately 5,000 and 500 square centimeters per gram of catalyst.

If desirable, the apparatus illustrated in FIGURE 1 may be housed underground, in a concrete enclosure, or in any other effective nuclear shielding. In such cases the free ends of the conduit 12 and the conduits 19, 22 would be passed through this shielding to permit air to be drawn from and exhausted to the atmosphere, respectively.

In operation, after the tank 3 has been filled with water 7 to a level at which the fuel elements 11 are completely submerged and contains the proper amount of catalyst particles 26, the valve 18 is opened and the valve 21 is closed. The catalyst particles 26 in the body of water 7 should be in sufficient quantity to permit a fluidized bed of the desired height to be established within the tank 3, the fluidized bed having a catalyst content of approximately between 10 and 50 grams per liter of water. The pump 13 is then energized and the valve 14 opened to permit air to flow into the tank 3 at a rate that imparts a sufficient velocity to the catalyst particles 26 to establish a fluidized particle bed within the tank. By thus establishing a fluidized bed of catalyst particles 26, the maximum area of surface contact is provided between the catalyst and the nitrogen contained in the air passing therethrough. The velocity of the air necessary to establish a satisfactory fluidized bed is dependent upon the type and size of the particles of catalyst 26 and the bed height, which is selected to produce the optimum energy transfers from the fuel elements 11 to the water 7, from the free radicals of water to the nitrogen and from the catalyst 26 to the nitrogen.

Irradiation of the body of water 7 produces ions, activated molecules and free radicals of water such as H, OH and $HO_2$ which in turn attack nitrogen from the air passing through the fluidized bed to form oxides of nitrogen. Since any impurities present in the water will decrease the efficiency of the process, best results are obtained by using distilled water.

The products of the reaction and the unreacted portion of the air from the tank 3 pass through the conduit 16, the valve 18 and the cold trap 20. The oxides of nitrogen are condensed in the cold trap 20 and only the unreacted portion of the air is liberated therefrom. This unreacted portion of the air may be re-cycled through the conduit 12 if desired. After a predetermined amount of the products of the reaction have been collected within the cold trap 20, the valve 18 is closed and the valve 21 opened to direct the unreacted air and products of reaction from the tank 3 through the conduit 22 and the cold trap 23. The oxides of nitrogen are condensed in the conduit 22 within the cold trap 23 while the unreacted air is exhausted from the cold trap 23. Again this unreacted portion of the air may be re-cycled through the conduit 12 if desired. While the unreacted air and the products of the reaction are being directed towards the cold trap 23, the condensed products of reaction contained in the conduit 19 within the cold trap 20 are removed from the conduit 19 and collected in a collection tank (not shown). This may be accomplished by connecting the conduit 19 to the collection tank and applying heat to the condensed products of reaction so that they will vaporize and flow into the collection tank. The unreacted air and products of the reaction are alternately cycled through the cold traps 20 and 23 and collected therefrom to provide continuous system operation. Other means for separating the reaction products from the unreacted portion of the air and the collection of the oxides of nitrogen will readily suggest themselves to those skilled in the art.

It has previously been mentioned that others have heretofore proposed the irradiation of atmospheric air to fix nitrogen contained therein. The distinct advance in the art realized from the present invention is primarily due to the fact that a body of water contains many times more molecules than a body of air of similar size and, consequently, produces a far greater yield of free radicals, ions and activated states when subjected to radiation. In addition, the method employed in this process to obtain maximum surface contact between a catalyst and the nitrogen content of air greatly enhances the yield of oxides of nitrogen.

In the embodiment of the invention illustrated in FIGURE 1, a source of nuclear energy is located in the body of water 7 contained within the tank 3. An alternate means for irradiating the catalytic fluidized bed is shown in FIGURE 2. As illustrated therein, a tank 27 is provided with a thermal insulating jacket 28 and has a perforated plate 29 mounted across the interior thereof and spaced a small distance from the bottom thereof. The tank 27 is connected to conduits 12 and 16 in a manner identical to that illustrated in FIGURE 1. The tank 27 is connected to a source of water by a conduit 30 provided with a valve 31 and is partially filled with a body of water 32. Connected to the tank 27 in the vicinity of the lower extremity thereof is a conduit 33 which includes a valve 34 permitting water 32 to be drained from the tank. A conduit 35 provided with a valve 36 is connected to the top portion of the tank 27 in a manner enabling particles of a catalyst 37 to be injected into the tank.

A radiating source 38 is located externally of the tank 27 and in this case may be either a source of nuclear energy or a source of electron, gamma and/or X-ray radiation such as a Van de Graaff generator or a linear accelerator. The radiation emitted from the source 38 is directed towards and through an aperture 39 in the thermal insulating jacket 28 and a "window" 40 provided in a wall 41 of the tank 27 so as to strike the catalytic fluidized bed within the tank. The "window" 40 is formed of a material such as aluminum or copper which has a low stopping power for electrons and electromagentic radiation. System operation is otherwise identical to that illustrated in FIGURE 1.

This invention may be performed and/or embodied in other ways without departing from the spirit or essential character thereof. The process and embodiments of the invention described herein are therefore to be considered as in all respects illustrative and not restrictive, the scope of the invention being indicated by the appended claims, and all changes which come within the meaning and range of equivalency of the claims are intended to be embraced therein.

The invention claimed is:

1. An improvement in a process for the fixation of nitrogen comprising the step of subjecting a fluidized bed, wherein particles of a catalyst of the type which reduces the strength of the bond between the atoms in a molecule of nitrogen are suspended in a body of water by the passage of air through said water, to high energy radiation effective to produce ionized particles of said water.

2. The process of claim 1 wherein the size of said particles of said catalyst is between 0.5 and 5 microns.

3. A process for the fixation of nitrogen comprising the steps of:
   (a) establishing a fluidized bed wherein particles of a catalyst are suspended in a body of water by the passage of air through said water, said catalyst being of the type which reduces the strength of the bond between the atoms in a molecule of nitrogtn contained in said air;
   (b) subjecting said fluidized bed to high energy irradiation effective to produce free radicals, ions and activated molecules of said water which will attack the nitrogen molecules from said air to produce oxides of nitrogen; and
   (c) separating said oxides of nitrogen from the unreacted portion of said air.

4. The process of claim 3 wherein the size of said particles of said catalyst is between 0.5 and 5 microns.

5. An improvement in a process for the fixation of nitrogen comprising the steps of:
(a) passing air through a body of water to establish a fluidized bed in said body of water comprising particles of a catalyst which reduces the strength of the bond between the atoms in molecules of nitrogen contained in said air; and
(b) subjecting said water to high energy irradiation effective to produce ionized molecules thtreof which will attack said nitrogen to produce oxides of nitrogen.

6. The process of claim 5 wherein said body of water is subjected to nuclear irradiation.

7. The process of claim 5 wherein said catalyst is selected from the group consisting of tungsten; tungsten alloys; mixtures of iron, aluminum and potassium oxides; and iron oxide plus molybdenum.

8. The process of claim 5 wherein the catalyst content of said fluidized bed is 10 to 50 grams of said catalyst per liter of water.

References Cited

UNITED STATES PATENTS

| | | | |
|---|---|---|---|
| 3,258,404 | 6/1966 | Hentz | 176—39 |
| 2,898,277 | 8/1959 | Harteck et al. | 204—154 |
| 3,067,115 | 12/1962 | Clingman | 204—154 |
| 2,064,260 | 12/1936 | Herrmann | 204—157.1 |

FOREIGN PATENTS 595,264   3/1960   Canada.

HOWARD S. WILLIAMS, *Primary Examiner.*